US009862576B2

(12) United States Patent
Stelmach

(10) Patent No.: US 9,862,576 B2
(45) Date of Patent: Jan. 9, 2018

(54) MATERIAL CARRYING DEVICE

(71) Applicant: John Stelmach, Prescott, AZ (US)

(72) Inventor: John Stelmach, Prescott, AZ (US)

( * ) Notice: Subject to any disclaimer, the term of this patent is extended or adjusted under 35 U.S.C. 154(b) by 74 days.

(21) Appl. No.: 15/180,197

(22) Filed: Jun. 13, 2016

(65) Prior Publication Data

US 2017/0355573 A1 Dec. 14, 2017

(51) Int. Cl.
*B65G 7/12* (2006.01)
*B66C 1/22* (2006.01)

(52) U.S. Cl.
CPC .................................... *B66C 1/22* (2013.01)

(58) Field of Classification Search
CPC ................ B66C 1/22; A45F 5/10; B65G 7/12
USPC .................................. 294/15, 67.2, 67.4, 26
See application file for complete search history.

(56) References Cited

U.S. PATENT DOCUMENTS 2,312,256 A * 2/1943 Lumley ..................... A45F 5/10 220/23.4
2,428,941 A * 10/1947 Packard .................. B65G 7/12 294/15
D217,002 S * 3/1970 Wagner ........................... 294/15
4,098,442 A * 7/1978 Moore ..................... B65G 7/12 294/141
4,113,160 A 9/1978 Spiers
D255,317 S * 6/1980 Slinkard ....................... 294/137
4,630,838 A * 12/1986 Stockton ................ B62B 3/108 280/47.17
D317,703 S * 6/1991 Cydrus ........................... 294/15
5,257,843 A * 11/1993 Nunn ...................... B65G 7/12 294/15
D404,985 S * 2/1999 Fredrickson .................... 294/15
D423,309 S 4/2000 Sirmans
6,102,462 A 8/2000 Fields
6,478,352 B1 * 11/2002 Fredrickson ............. B65G 7/12 294/15
6,520,555 B1 * 2/2003 Hamm ..................... B65G 7/12 294/15
8,251,421 B1 * 8/2012 Homan ..................... A45F 5/10 294/142
2002/0105198 A1 * 8/2002 Fredrickson ............. B65G 7/12 294/15
2012/0111906 A1 * 5/2012 Sanfilippo ............... B25B 5/101 224/191

FOREIGN PATENT DOCUMENTS

DE 3431400 A1 * 2/1986 ............... B65G 7/12
GB 2171352 A * 8/1986 ............... B65G 7/12

* cited by examiner

*Primary Examiner* — Gabriela M Puig
(74) *Attorney, Agent, or Firm* — Harpman & Harpman

(57) ABSTRACT

A carrying device for large panels, such as drywall, plywood and the like. The carrying device includes a rigid one-piece panel receiving bracket with a dual flexible strap and adjustable handle extending therefrom. The panel is received on a platform portion of the bracket which has multiple impact surfaces for positioning, engaging and releasing the bracket from the panel so positioned thereon and a panel positioning strap handle attachment extending therefrom.

11 Claims, 4 Drawing Sheets

MATERIAL CARRYING DEVICE

BACKGROUND OF THE INVENTION

1. Technical Field

This invention is related to carrying devices that aid in the physical engagement or lifting and transporting dimensionally large unyieldly objects such as material panels.

2. Description of Prior Art

Prior art devices of this type have been developed to allow for lifting and moving large objects by hand, see for example U.S. Pat. Nos. 4,113,160, 6,102,462, Design Patents D317,703, D423,309.

In U.S. Pat. No. 4,113,160 a sheet sling can be seen having a pair of identical elongated material engagement elements adjustably secured to one another for selective reversal edge engagement of a sheet to be transported.

U.S. Pat. No. 6,102,462 illustrates a mattress and sheet material carrying apparatus having a main strap with a pair of dependent load support strap members extending therefrom allowing two individuals to group oppositely disposed strap ends and lift the material load between them.

U.S. Pat. No. 8,251,421 claims a panel carrier having a flexible shape with an attached rigid handle secured to a contoured U-shaped panel receiving platform.

U.S. Design Patent D317,703 discloses an ornamental design for a drywall carrier having a rigid handle with an eccentric extending shaft and a spade like end defining a material engagement lip there along.

U.S. Design Patent D423,309 claims an ornamental design for a handle for carrying wall board having a flexible cord and attached grip with a material engagement element attached to its oppositely disposed end.

SUMMARY OF THE INVENTION

A handle enabled carrying device having a panel receiving end element and a flexible lifting strap with an adjustable handle thereon. A panel engagement body member has a panel receiving platform with oppositely disposed impact positioning portion and vertically spaced, oppositely disposed extending impact engagement release elements to assist in removing the device from engagement with the panel. A centralized apertured lifting tab is formed in a vertically offset orientation on the body member to accommodate panel positioning and from which the flexible lifting strap extends with the handle which is adjustable on the strap to afford angular inclination lifting capabilities.

DESCRIPTION OF THE DRAWINGS

FIG. 6 is a perspective view of an alternate form of the material carrier of the invention with repositioned spaced strap engagement apertured tabs and a central impact release tab there between.

DETAILED DESCRIPTION OF THE INVENTION

Figure 3:
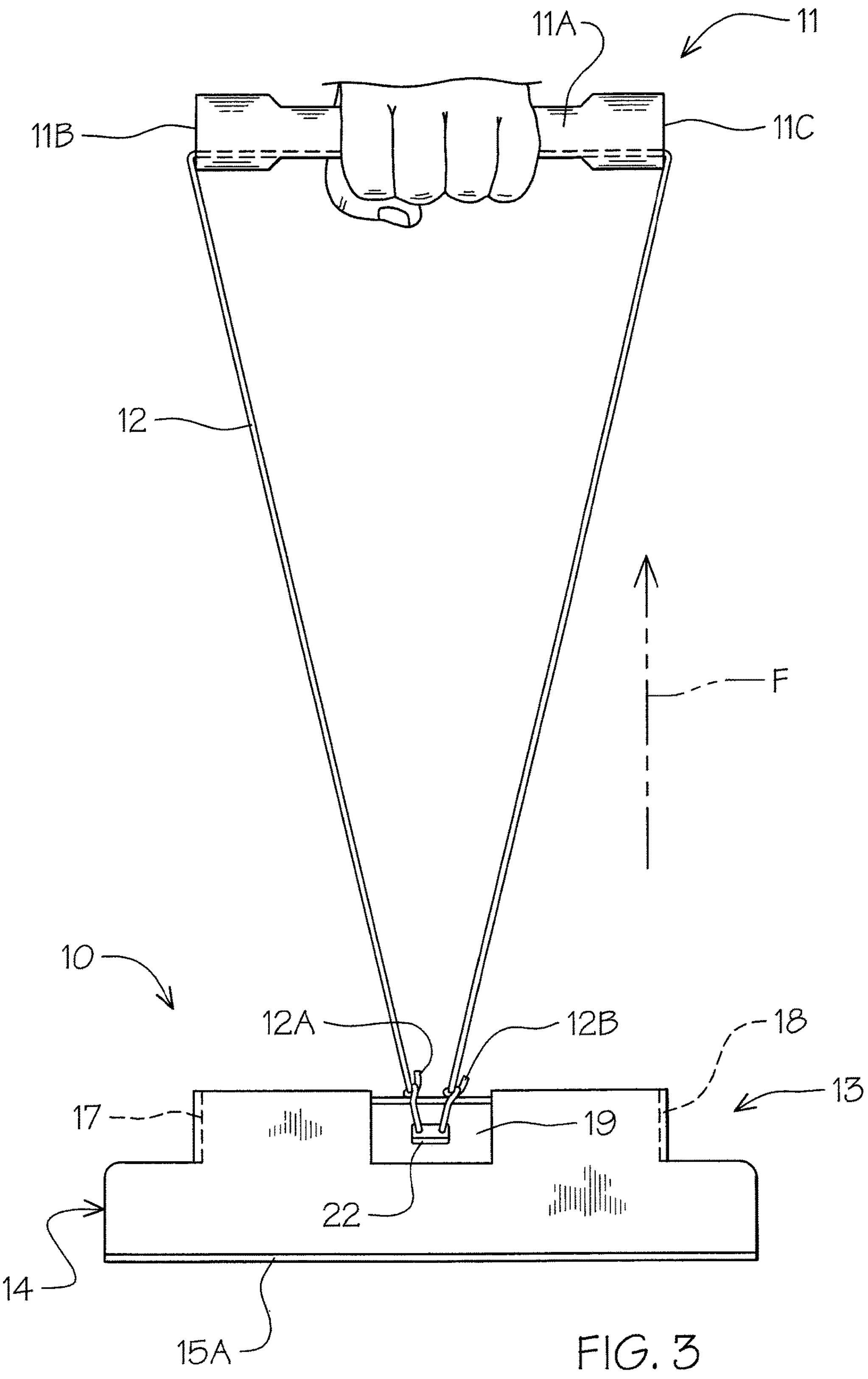
FIG. 3 is a front elevational view of the panel carrier in use engaged for illustration purposes by a user's hand representation.

Referring to FIG. 3 of the drawings, a panel carrying device 10 can be seen having a cylindrical handle 11 with a hand engagement central portion 11A and oppositely disposed open ends 11B and 11C.

A flexible strap 12 extends through the handle engagement portion 11A having oppositely disposed ends 12A and 12B secured centrally to a panel engagement lifting bracket 13 of the panel carrying device 10 as will be described in detail hereinafter.

The flexible strap 12 can be of any suitable material configuration that has significant strength to accommodate a wide variety of lifting applications.

Figure 1:
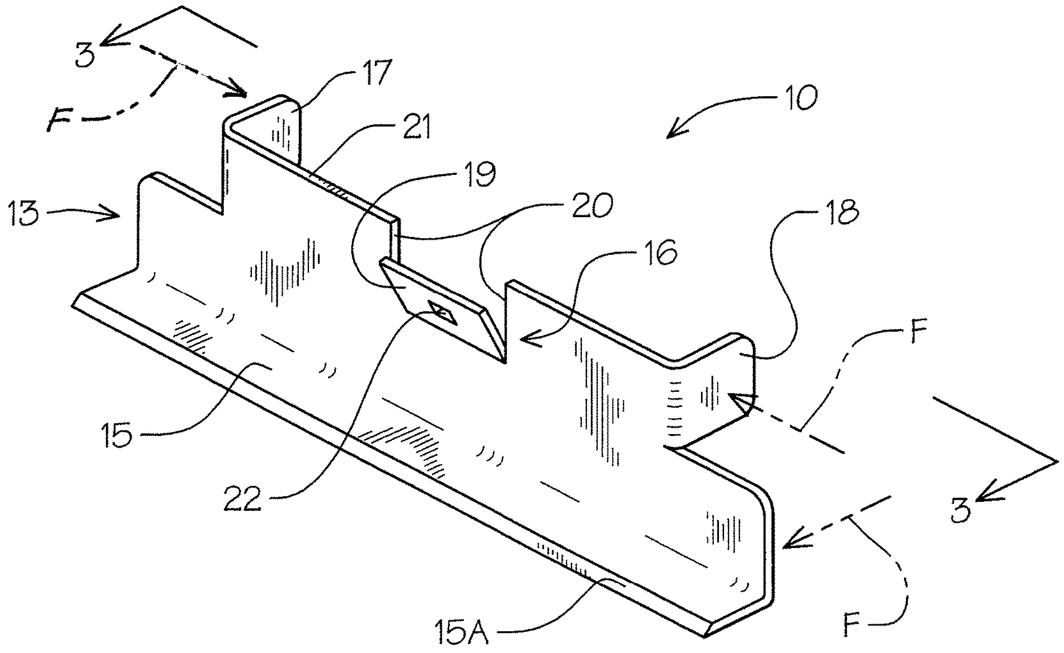
FIG. 1 is a perspective view of the carrier engagement portion of the primary panel carrier of the device.
Figure 2:
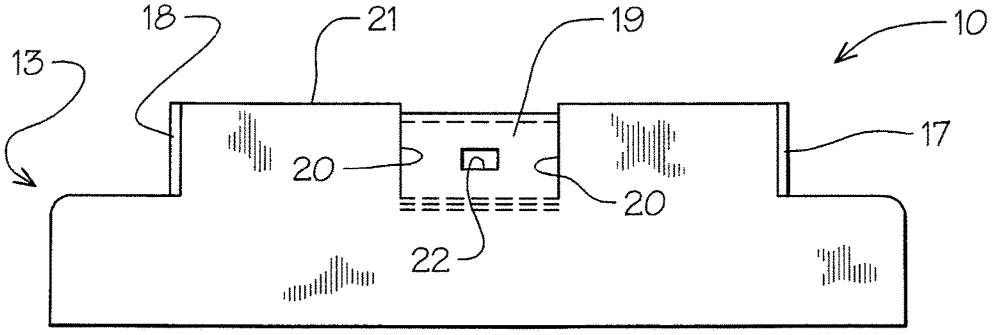
FIG. 2 is a rear elevational view thereof on lines 3-3 of FIG. 1.

The panel carrying device has a primary one piece panel engagement and lift bracket 13 formed of a general angle iron configuration main body member 14 with an elongated material receiving platform portion 15 extending at right angles from a corresponding upstanding portion 16 as best seen in FIGS. 1 and 2 of the drawings.

A pair of spaced oppositely disposed parallel impact release tabs 17 and 18 are formed inwardly from their respective ends of the upstanding portion 16 in opposing orientation to the material receiving platform portion 15.

The release tabs 17 and 18 are formed by cutting and bending respective end portions towards one another at right angles to form the pair of spaced parallel impact release tabs 17 and 18. A lifting strap aperture attachment tab 19 is formed in the upstanding portion 16 midway between the hereinbefore described impact release tabs 17 and 18. The attachment tab 19 is formed by a pair of parallel longitudinally spaced cuts at 20 in a longitudinal edge 21 of the upstanding portion 16 allowing for bending angular deflection thereof to define the tab 19 outwardly in opposed relation to the release tabs 17 and 18.

An opening at 22 is formed in the attachment tab 19 through which respective ends 12A and 12B of the flexible lift strap 12 extend and are secured, in this example, by tying as best seen in FIG. 3 of the drawings. The attachment tab 19 is formed, as noted, by bending a portion of the upstanding body member portion 16 outwardly from its vertical plane towards material receiving platform 15. It will be evident, therefore, that angular inclination of the attachment tab 19 will effectively adjust to a vertical panel orientation during engagement as seen in FIG. 4 of the drawings that is conducive to lifting a panel P so engaged due to the geometry of the handgrips and its offset point of attachment by the strap 12.

Figure 4:
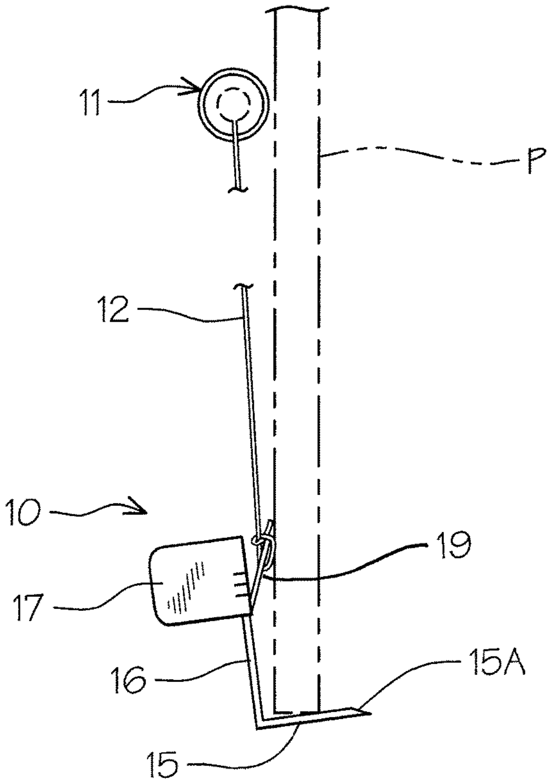
FIG. 4 is an end elevational view of the primary form of the panel carrier in solid lines with an engaged material sheet positioned within shown in broken lines for illustration.
Figure 5:
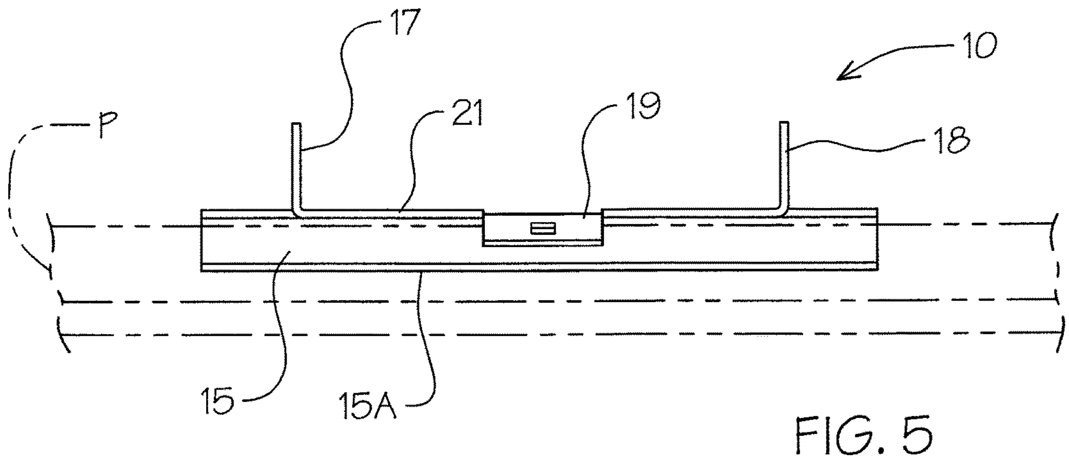
FIG. 5 is a top elevational view of the primary panel carrier of the invention with the material sheet engaged therein shown in broken cut-away lines.

Referring now to FIGS. 3 and 4 of the drawings, the panel carrying device 10 of the invention can be seen positioned for and in use under the bottom edge of a panel P to be lifted and transported by imparting manual lifting force to the handle 11 shown by force arrows F.

Typically the user (not shown) would use their foot, for example, to engage the impact portion of the upstanding portion 16 for positioning the platform 15 under the panel P. A leading edge 15A of the platform portion 15 is tapered so as to assist in the insertion under the panel P in this application.

Once engaged, the hereinbefore described flexible strap 12 and the attached handle 11 allows for a secure and proper extended grip for lifting the angled shaped main body member 14 of the panel carrying device 10 and the panel positioned thereon.

Once the panel P is positioned at its destination it can be easily released from the receiving platform 15 by tapping either one or both of the hereinbefore described impact and release tabs 17 and 18 sequentially dislodging the carrying device 10 of the invention out from under the panel P as described.

The preferred embodiment of the panel carrier 10 is constructed preferably of an integral piece of metal such as steel or aluminum for durability and strength given its use requirements and ease of angle and tab formation.

It will be evident, therefore, that given the universal nature of the receiving platform portion 15, it will be easily adapted to other engaging and lifting venues having engagement surface edges such as appliances, not shown, providing a safe, simple, portable and self-contained material engagement and lifting aid with an adjustable handle configuration to afford an effective grip and maneuvering of large material such as panels and the like.

Figure 6:
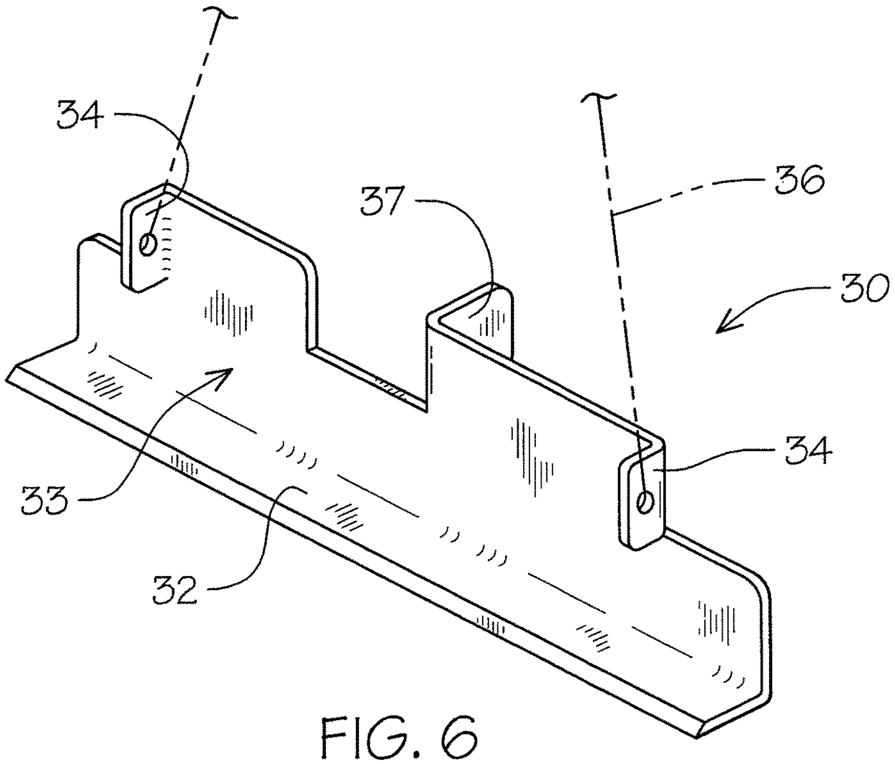
Figure 7:
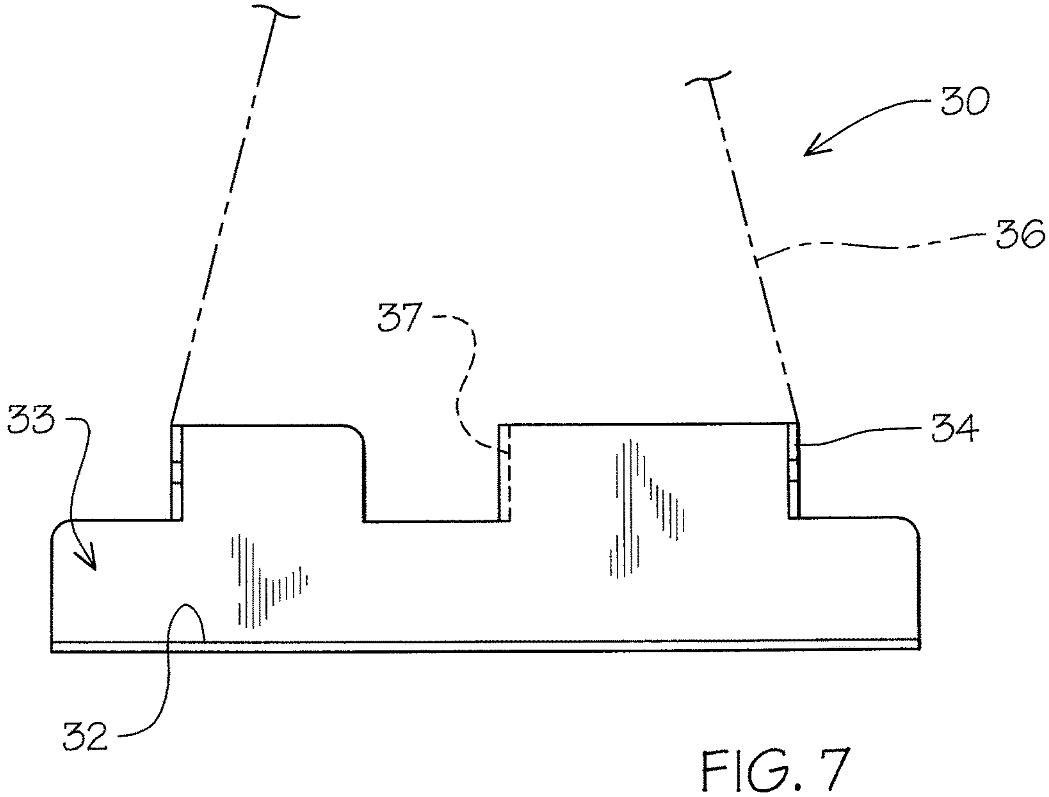
FIG. 7 is a front elevational view thereof with strap representation shown in broken lines.

Referring now to FIGS. 6 and 7 of the drawings, an alternate form of the invention 30 can be seen with a modified lifting bracket body. In this form of the invention a material receiving platform 32 extends at right angle to a corresponding upstanding bracket portion 33 as in the primary form of the invention.

A pair of longitudinally spaced apertured lift attachment tabs 34 are formed by cutting and outwardly bending respective end portions of the upstanding bracket portion 33. The alternate lift tabs 34 are foreshortened and apertured for receiving the free ends of a corresponding flexible strap and handle assembly representation 36 illustrated by broken lines in FIG. 7 of the drawings.

An alternate tap and release tab 37 is formed centrally in the upstanding bracket portion 33 between and is bent outwardly similar to the lift tabs 34, but in opposition relation thereto. The tap and release tab 37 is defined by cutting and bending, as in the hereinbefore described lift tabs 34.

It will be evident that tap release tab 37 performs the function as the hereinbefore described multiple release tabs 17 and 18 in the primary form of the invention allowing the user, not shown, to physically tap or impact there against to unseat the receiving platform 32 from engagement under the lifting material after lifting, positioning and transporting has occurred.

The advantages of the alternate material carrier of the invention as described are that of the lift tabs 34 being spaced in relation to one another on the lifting bracket body member 31 by providing two independent spaced stabilizing attachment points for the flexible strap ends and handle assembly 36.

Such an orientation may be of increased value when engaging a variety of material to lift, but not limited only to sheet material, but other bulky items, as hereinbefore noted.

It will thus be seen that a unique and novel panel carrying device has been illustrated and described and it will be evident to those skilled in the art that various changes and modifications may be made thereto without departing from the spirit of the invention.

Therefore, I claim:

1. A panel carrying device comprising, a one piece elongated panel receiving bracket including an upstanding portion and an integral angularly disposed panel receiving platform, a pair of oppositely disposed panel release tabs extending from said upstanding portion, a central position angular offset strap attachment tab, a flexible strap and rigid handle extending from said strap attachment tab to effect lifting of said panel carrying device.

2. The panel carrying device set forth in claim 1 wherein said receiving platform extends at right angles to said upstanding receiving bracket portion.

3. The panel carrying device set forth in claim 1 wherein said panel receiving platform further comprises, a tapered material engagement free edge along said panel receiving platform.

4. The panel carrying device set forth in claim 1 wherein said flexible strap is adjustable in length and said handle is of an elongated tubular element slidably positioned on said flexible strap.

5. The panel carrying device set forth in claim 1 wherein said panel receiving platform extends the length of said receiving bracket.

6. The panel carrying device set forth in claim 1 wherein said panel release tab extends in oppositely disposed vertical spaced relation to said panel receiving platform.

7. The panel carrying device set forth in claim 1 is made of metal.

8. A panel carrying device for selective engagement with panelized material comprises, a one piece elongated panel receiving bracket including an upstanding portion with an angular disposed panel receiving platform.

a pair of apertured oppositely disposed spaced parallel strap attachment tabs extending at right angles from said upstanding portion, a central release tab extending at right angles from said upstanding bracket portion in opposition to said attachment tabs, a flexible strap extending from said respective strap attachment tabs, a rigid handle on said strap.

9. The panel carrying device set forth in claim 8 wherein said panel receiving platform further comprises, a tapered material engagement free edge on said panel receiving platform.

10. The panel carrying device set forth in claim 8 is made of metal.

11. The panel carrying device set forth in claim 8 wherein said flexible strap is length adjustable and said strap handle is slidably disposed on said strap.

* * * * *